US008752856B2

(12) United States Patent
Sarajian et al.

(10) Patent No.: US 8,752,856 B2
(45) Date of Patent: Jun. 17, 2014

(54) HITCH COVER INCLUDING ADAPTER

(75) Inventors: Kissak T. Sarajian, Brookfield, WI (US); Chad M. Cushman, Racine, WI (US)

(73) Assignee: Trik Topz, Cerritos, CA (US)

( * ) Notice: Subject to any disclaimer, the term of this patent is extended or adjusted under 35 U.S.C. 154(b) by 0 days.

(21) Appl. No.: 13/608,295

(22) Filed: Sep. 10, 2012

(65) Prior Publication Data

US 2014/0070518 A1  Mar. 13, 2014

(51) Int. Cl.
*B60D 1/60* (2006.01)
*B60D 1/52* (2006.01)

(52) U.S. Cl.
USPC ......................................................... 280/507

(58) Field of Classification Search
USPC ...................................... 280/491.5, 506, 507
See application file for complete search history.

(56) References Cited

U.S. PATENT DOCUMENTS

| | | | | |
|---|---|---|---|---|
| 3,552,775 | A * | 1/1971 | Warner | 280/492 |
| 5,873,594 | A | 2/1999 | McCoy et al. | |
| 6,010,142 | A | 1/2000 | McCoy et al. | |
| 6,079,136 | A | 6/2000 | Kozlarek | |
| D433,358 | S | 11/2000 | McBroom | |
| 6,199,892 | B1 * | 3/2001 | Dahl | 280/507 |
| D444,433 | S | 7/2001 | McBroom et al. | |
| 6,463,686 | B1 | 10/2002 | Eisenbraun | |
| D471,137 | S | 3/2003 | Shepherd et al. | |
| 6,553,697 | B1 | 4/2003 | Pichan | |
| 6,554,171 | B1 * | 4/2003 | Ewing, III | 224/521 |
| D475,327 | S | 6/2003 | McCoy et al. | |
| 6,581,954 | B2 * | 6/2003 | Chadwick | 280/491.1 |
| 6,834,879 | B1 * | 12/2004 | Lorman | 280/506 |
| 6,896,282 | B1 | 5/2005 | McKinley | |
| 6,908,096 | B2 | 6/2005 | Lewis et al. | |
| 6,945,551 | B2 | 9/2005 | Blake | |
| D553,548 | S | 10/2007 | Douglas | |
| 7,600,774 | B1 * | 10/2009 | Speer et al. | 280/506 |
| 7,717,455 | B2 * | 5/2010 | Morris | 280/506 |
| 7,784,813 | B2 * | 8/2010 | Columbia | 280/511 |
| 2002/0033587 | A1 | 3/2002 | McConnell | |
| 2004/0046361 | A1 * | 3/2004 | Lewis et al. | 280/507 |
| 2005/0067812 | A1 | 3/2005 | Moss et al. | |
| 2006/0209549 | A1 | 9/2006 | Valdez | |
| 2007/0187447 | A1 | 8/2007 | Hamann | |

OTHER PUBLICATIONS

SportRack A30603 3 Bike Hitch Rack fits both 2" and 1.25" Hitch Receivers. Datasheet [online] Proline Products, Inc. (retrieved on Jul. 25, 2008). Retrieved from the Internet <URL http://www.prolineracks.com/SportRack-A30603-hitch-3-bike-rack.html>.*

(Continued)

*Primary Examiner* — Kevin Hurley
(74) *Attorney, Agent, or Firm* — Michael Best & Friedrich LLP

(57) ABSTRACT

A hitch cover for use with a first hitch receiver having a first size and a second hitch receiver having a second size larger than the first size. The hitch cover includes a faceplate, a shaft that extends from the faceplate, the shaft configured to be received in the first hitch receiver to couple the faceplate to the first hitch receiver. The cover further includes an adapter including a first end, a second end, and an aperture extending through the first end, and a fastener that removably couples the adapter and the shaft. The shaft is received in the aperture of the adapter and the shaft and the adapter are configured to be received in the second hitch receiver to couple the faceplate to the second hitch receiver.

20 Claims, 4 Drawing Sheets

(56) References Cited

OTHER PUBLICATIONS

Trailer Hitch Cover, Trailer Hitch Product Sheet, Road Sport Inc., Oct. 8, 2008.

Replacement 1-¼" and 2" Backing for CR-xxx Hitch Covers, Pilot, Retrieved from Internet on Apr. 4, 2012 <URL: http://www.etrailer.com/Accessories-and-Parts/Pilot-Automotive/CR-2IN.html>.

* cited by examiner

HITCH COVER INCLUDING ADAPTER

BACKGROUND

The present invention relates to hitch covers for vehicle trailer hitches.

Trailer hitches for passenger cars and trucks often include a receiver and a ball mount that is received in the receiver. The ball mount is often removed from the receiver when the trailer hitch is not in use. To common sizes of receivers (i.e., dimension of an aperture that receives the ball mount) are 1¼ inch and 2 inch.

SUMMARY

In one embodiment, the invention provides a hitch cover for use with a first hitch receiver having a first size and a second hitch receiver having a second size larger than the first size. The hitch cover includes a faceplate, a shaft that extends from the faceplate, the shaft configured to be received in the first hitch receiver to couple the faceplate to the first hitch receiver. The cover further includes an adapter including a first end, a second end, and an aperture extending through the first end, and a fastener that removably couples the adapter and the shaft. The shaft is received in the aperture of the adapter and the shaft and the adapter are configured to be received in the second hitch receiver to couple the faceplate to the second hitch receiver.

In another embodiment the invention provides a hitch cover for use with a first hitch receiver having a first size and a second hitch receiver having a second size larger than the first size. The hitch cover includes a faceplate, a square shaft that extends perpendicular from the faceplate and configured to be received in the first hitch receiver, the square shaft includes a first elastically deformable tab configured to removably couple the faceplate to the first hitch receiver. The cover further includes an adapter including a first end, a second end, an aperture extending through the first end, and a second elastically deformable tab configured to couple the adapter to the square shaft. The shaft is received in the aperture of the adapter and the shaft and the adapter are configured to be received in the second hitch receiver to couple the faceplate to the second hitch receiver, and the square shaft does not extend into the aperture of the adapter to couple the faceplate to the first hitch receiver such that the adapter is not utilized to couple the faceplate to the first hitch receiver.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
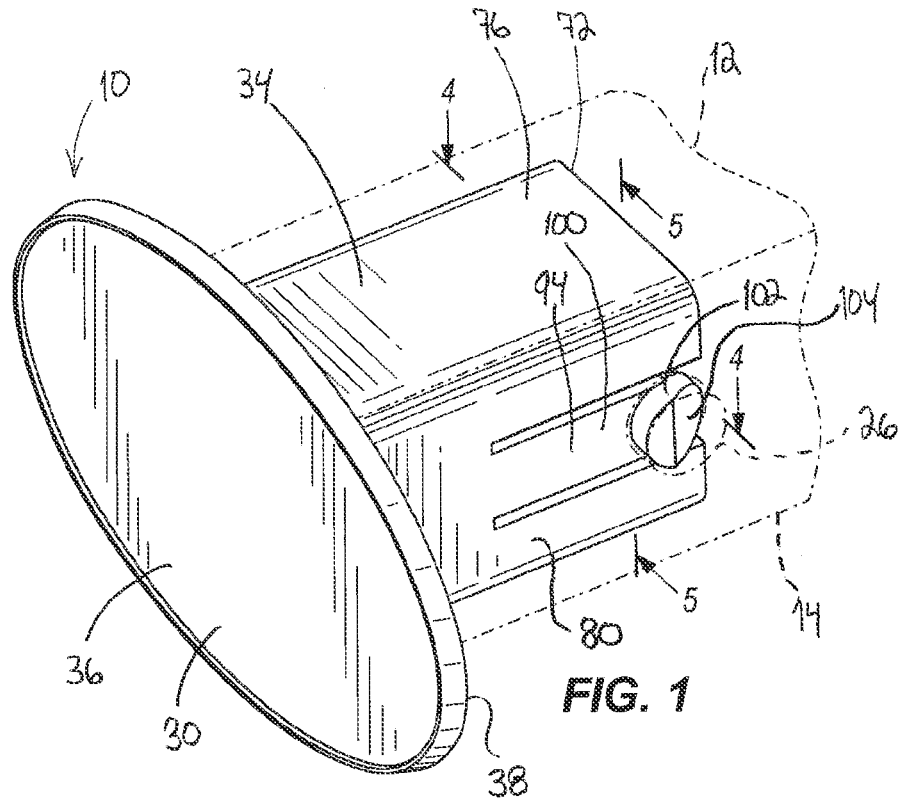
FIG. 1 is a perspective view of a hitch cover according to one embodiment of the invention.
Figure 6:
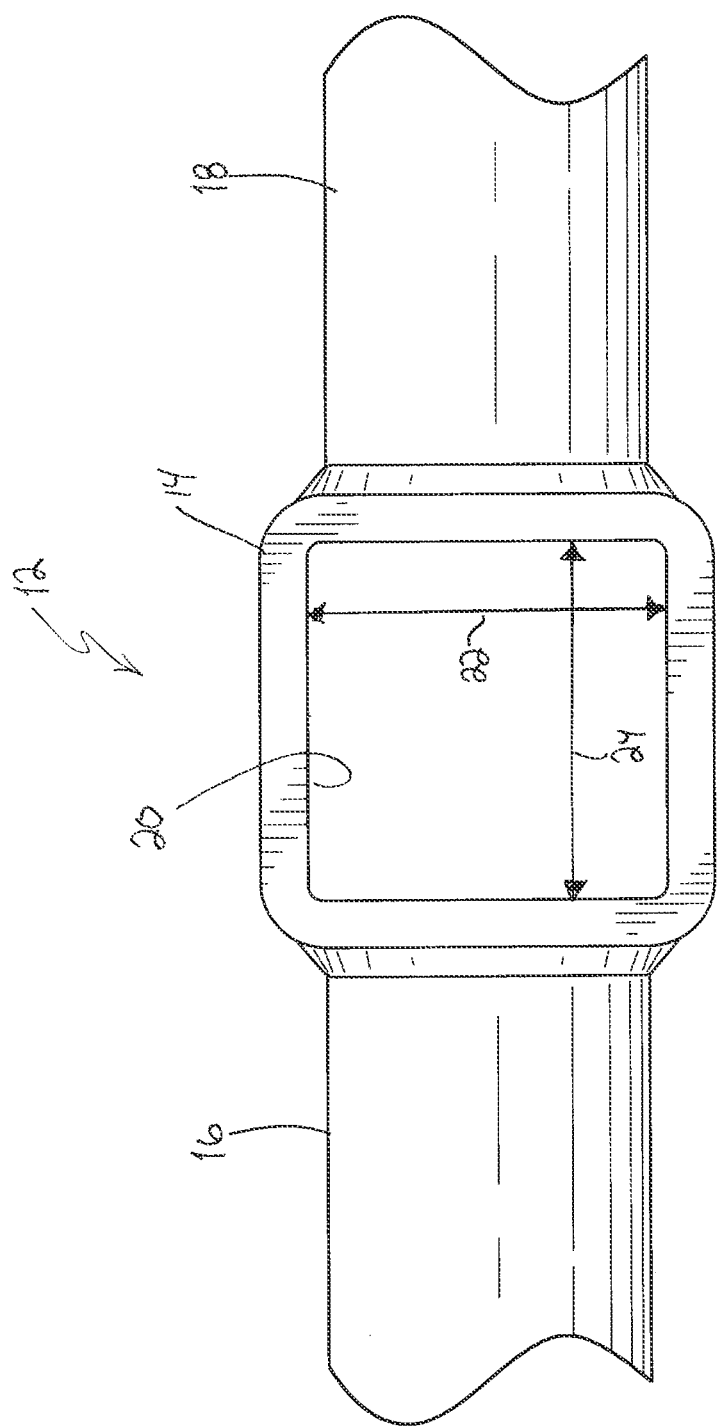
FIG. 6 is a side view of a hitch.

FIG. 1 illustrates at hitch cover 10 for use with a hitch 12. Referring to FIG. 6, the hitch 12 includes a hitch receiver 14, a first support 16, and a second support 18. The supports 16 and 18 couple the hitch receiver 14 to a vehicle, such as a passenger car or truck. The hitch receiver 14 includes a generally square aperture 20 that is configured to receive a square shaft of a ball mount, storage rack, etc. The aperture 20 has a height 22 and a width 24 (i.e., size) and the size of the aperture 20 can be different depending on the class or type of hitch 12. For example, in one class, the aperture 20 has a first size and the height 22 and the width 24 are both approximately 1¼ inch, and in another class, the aperture 20 has a second size and the height 22 and the width 24 are both approximately 2 inches. The aperture 20 can have other sizes depending on the type or class of the hitch 12. Referring to FIG. 1, the hitch receiver 14 includes a locking pin aperture 26 that is configured to receive a locking pin or the like to couple the ball mount or the like to the hitch 12.

As discussed, the aperture 20 (FIG. 6) can have the first size (e.g., 1¼ inch) or the second size (e.g., 2 inch) and the hitch cover 10 is configured to be used with hitches having either the first size or the second size to cover the aperture 20 and inhibit dirt, debris, road salt, etc. from entering the aperture 20 when the hitch 12 is not being used with a ball mount, storage rack, etc.

The hitch cover 10 includes a faceplate 30, a shaft 32, and an adapter 34. The faceplate 30 includes a front face 36 and a back face 38. Indicia, including designs, drawings, words, etc., can be located on the front face 36. The back face 38 includes a groove 40 that receives the adapter 34 to facilitate coupling the adapter 34 to the shaft 32 and faceplate 30, which will be discussed in more detail below. The shaft 32 extends from the back face 38 of the faceplate 30, and in the illustrated embodiment, the shaft 32 and the faceplate 30 are integrally formed as a single component, such as by molding.

Figure 2:
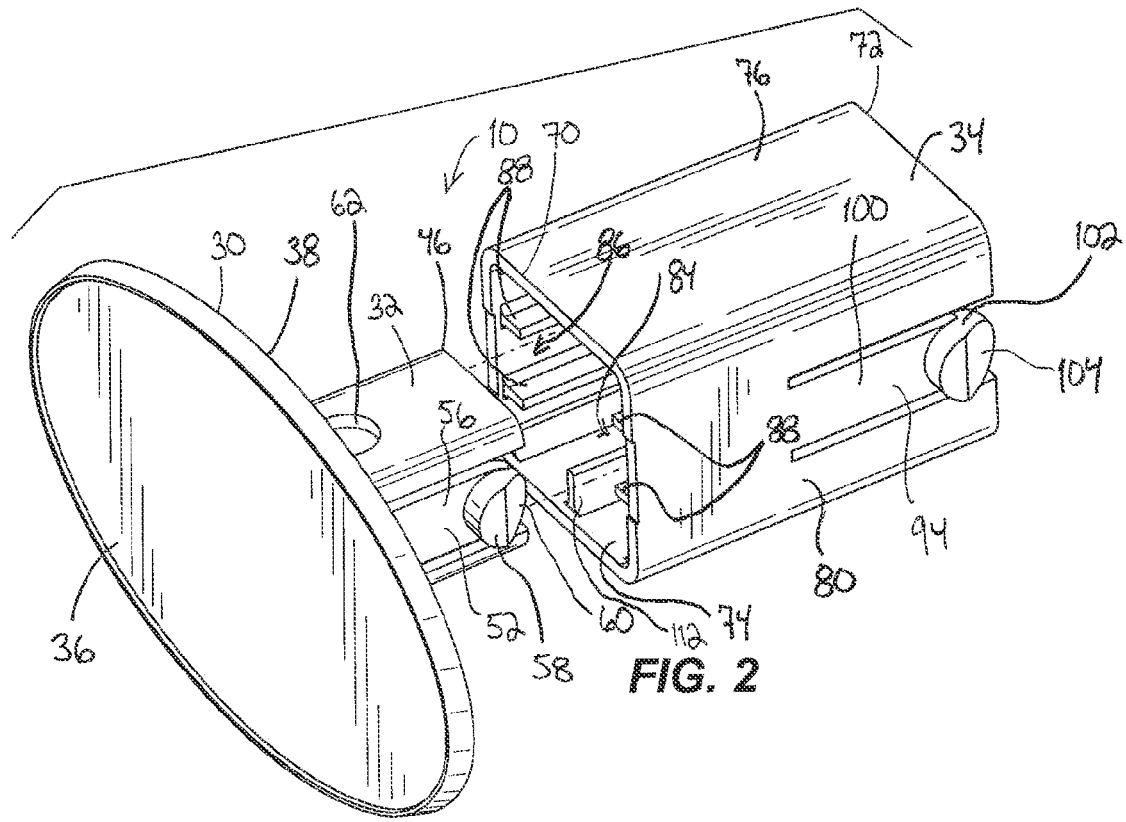
FIG. 2 is an exploded view of the hitch cover of FIG. 1.
Figure 3:
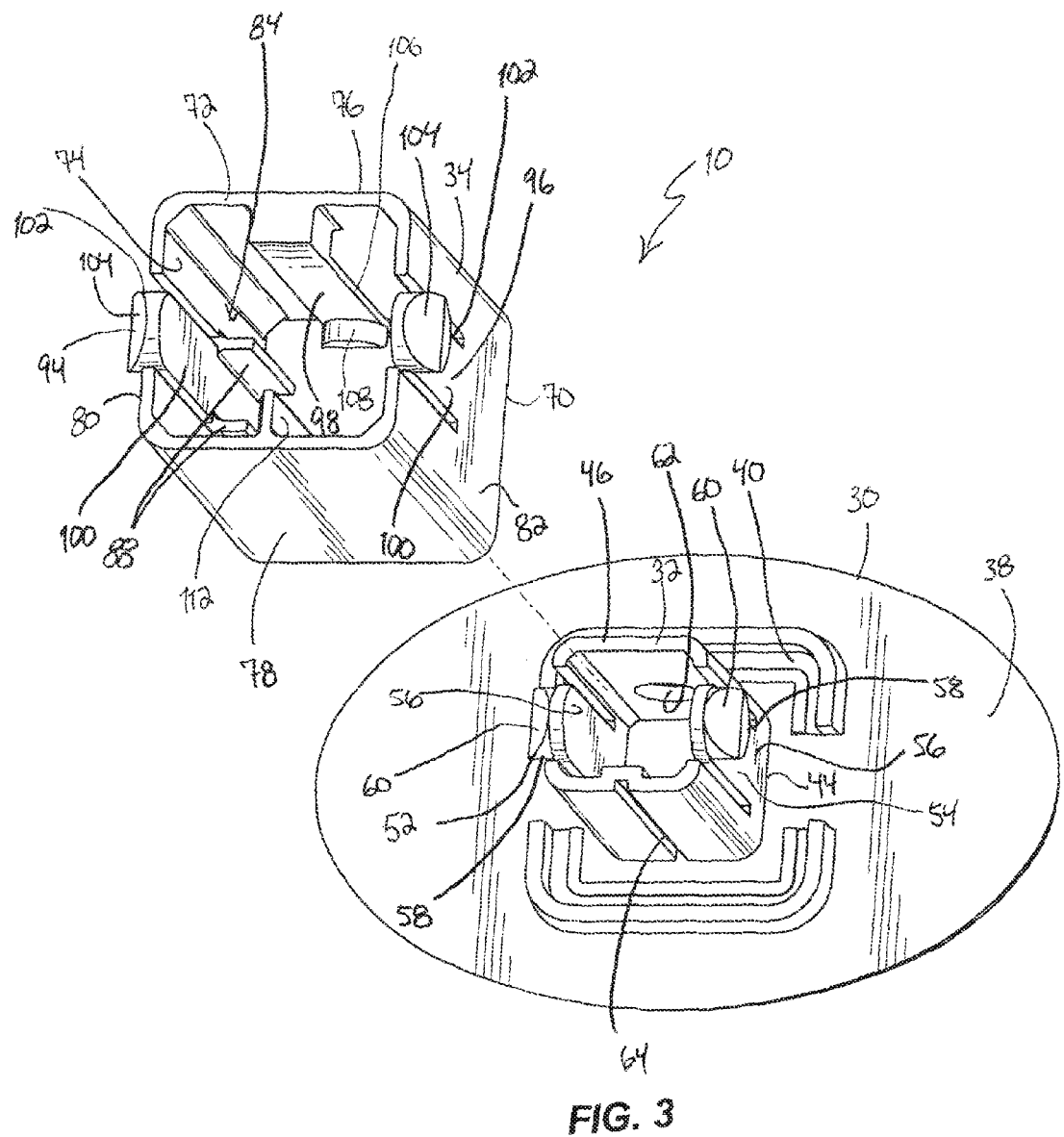
FIG. 3 is an alternative exploded view of the hitch cover of FIG. 1.

Referring to FIGS. 2 and 3, the shaft 32 includes a first end 44 and a second end 46. The faceplate 30 is adjacent the first end 44 and the second end 46 is opposite the first end 44 and is open such that the shaft 32 is generally hollow. Also, the illustrated shaft 32 is generally square and has a height 48 and a width 50 (FIGS. 5 and 6), and in one embodiment, the height 48 is approximately 1¼ inch and the width 50 is approximately 1¼ inch. The shaft 32 further includes a first fastener 52 and a second fastener 54 that can be used to couple the shaft 32 and the faceplate 30 to either the hitch receiver 14 or the adapter 34. The illustrated fasteners 52 and 54 are both integrally formed with the shaft 32 as a single component, such as by molding. The fasteners 52 and 54 both include an elastically deformable tab 56 and a cylindrical portion 58 located at an end of the tab 56. A cam surface 60 is formed on an end of the cylindrical portions 58, the purpose of which will be discussed in more detail below along with the operation of the cover 10. As best seen in FIG. 3, an aperture 62 extends through a top wall of the shaft 32 and an elongated recess 64 extends along the outside of a bottom wall of the shaft 32.

The adapter 34 includes a first end 70, a second end 72, and an aperture 74 that extends through the first end 70 and the second end 72. The adapter 34 further includes a top wall 76, a bottom wall 78, a first sidewall 80, and a second sidewall 82 that are arranged such that the adapter 34 is a generally square and hollow shaft. A first projection 84 extends from the first sidewall 80 into the aperture 74 and a second projection 86 extends from the second sidewall 82 into the aperture 74. The projections 80 and 82 are both formed by a pair of spaced rails 88.

Figure 4:
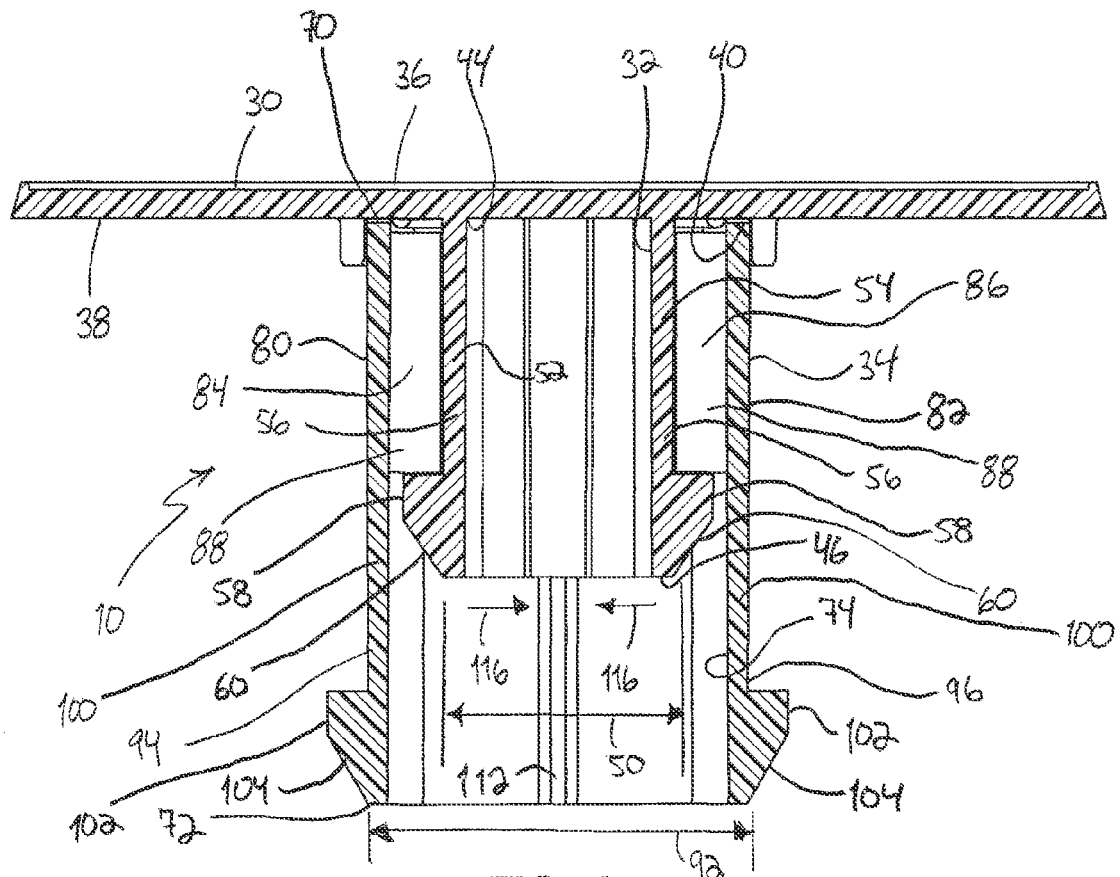
FIG. 4 is a cross-sectional view of the hitch cover of FIG. 1 taken along lines 4-4 of FIG. 1.
Figure 5:
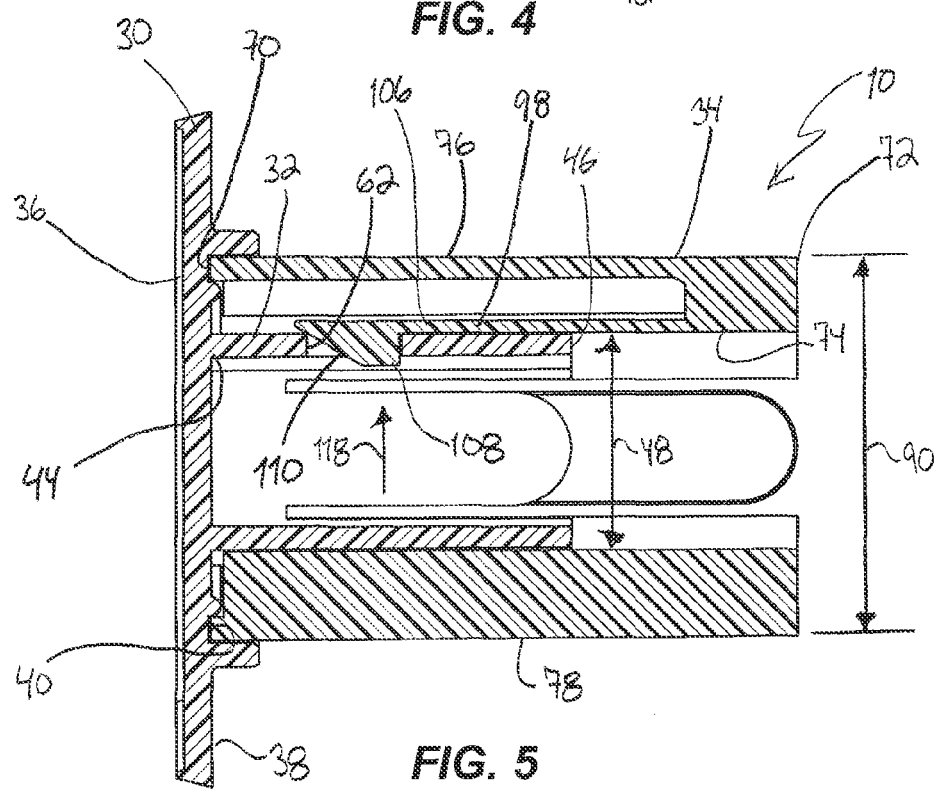
FIG. 5 is a cross-sectional view of the hitch cover of FIG. 1 taken along lines 5-5 of FIG. 1.

The walls 76, 78, 80, and 82 are spaced such that the illustrated adapter has a height 90 and a width 92 (FIGS. 4 and 5). In one embodiment, the height 90 is approximately 2 inches and the width 92 is approximately 2 inches.

Referring to FIGS. 2 and 3, the adapter 34 further includes a first fastener 94, a second fastener 96, and a third fastener 98. The illustrated first fastener 94 and the second fastener 96 are adjacent sidewalls 80 and 82, respectively, and can be used to couple the shaft 32, the faceplate 30, and the adapter 34 to the hitch receiver 14. The illustrated fasteners 94 and 96 are both integrally formed with the adapter 34 as a single component, such as by molding. The fasteners 94 and 96 both include an elastically deformable tab 100 and a cylindrical portion 102 located at an end of the tab 100. A cam surface 104 is formed on an end of the cylindrical portions 102, the purpose of which will be discussed in more detail below along with the operation of the cover 10. The third fastener 98 is adjacent the top wall 76 and can be used to couple the adapter 34 and the shaft 32. The illustrated fastener 98 is integrally formed with the adapter 34 as a single component, such as by molding. The fastener 98 includes an elastically deformable tab 106 and a cylindrical portion 108 located at an end of the tab 106. A cam surface 110 is formed on an end of the cylindrical portion 108. An alignment rail 112 extends from the bottom wall 78 of the adapter 34 and the rail 112 is received in the recess 64 of the shaft 32 to facilitate coupling the adapter 34 and the shaft 32.

In operation, the hitch cover 10 can be used with the hitch receiver 14 (FIG. 6) having different size apertures 20. More specifically, the illustrated cover 10 can be used when the aperture 20 of the hitch receiver 14 has the first size (e.g., height 22 and width 24 both about 1¼ inch) and when the aperture 20 of the hitch receiver 14 has the second size (e.g., height 22 and width 24 both about 2 inches). For example, in one embodiment, the hitch cover 10 is shipped to the user with the adapter 34 attached to the shaft 32 and the faceplate 30 as illustrated in FIG. 1. In this configuration, the cover 10 can be used with the second, larger, size hitch receiver 14. To attach the cover 10 to the hitch 12, the user simply inserts the adapter 34, with the shaft 32 located therein, into the aperture 20 of the hitch receiver 14. As the adapter 34 is being inserted into the aperture 20, the cam surfaces 104 of the fasteners 94 and 96 cause the tabs 100 to automatically elastically deflect in toward the aperture 74 to allow the adapter 34 to slide into the aperture 20. When the cylindrical portions 102 align with the locking pin aperture 26 (FIG. 1) of the receiver 14, the tabs 100 automatically deflect back out and push the cylindrical portions 102 into the aperture 26 to firmly couple the hitch cover 10 to the receiver 14. To remove the hitch cover 10 from the receiver 14, the user presses in on the cylindrical portions 102 to deflect the portions 102 in toward the aperture 74 and the user pulls the hitch cover 10 out of the aperture 20.

With the cover 10 removed from the hitch receiver 14, the user can configure the cover 10 for use with the first, smaller, size hitch receiver 14 (e.g., height 22 and width 22 are both about 1¼ inch). To configure the cover 10 for the first size hitch receiver, the user removes the adapter 34 and inserts the shaft 32 into the aperture 20 of the hitch receiver 14 without the adapter 34. To remove the illustrated adapter 34, the user presses in (i.e., in the direction of arrows 116 in FIG. 4) on the cam surfaces 60 of the fasteners 52 and 54 to deflect the tabs 56 so that the cylindrical portions 58 no longer engage the projections 84 and 86. Also, the user pushes the cylindrical portion 108 of the fastener 106 out of the aperture 62 (i.e., in the direction of arrow 118 in FIG. 5) so that the cylindrical portion 108 is no longer engaged in the aperture 62. With the fasteners 52, 54, and 98 no longer engaged, the user can slide the adapter 34 off of the shaft 32. When the adapter 34 is removed, the user inserts the shaft 32 into the smaller sized aperture 20 of the receiver 14. As the shaft 32 is inserted, the cam surfaces 60 cause the tabs 56 to automatically deflect into the shaft 32, which allows the shaft 32 to slide into the aperture 20. When the cylindrical portions 58 are aligned with the locking pin aperture 26, the tabs 56 automatically defect the cylindrical portions 58 into the aperture 26 to firmly couple the faceplate 30 to the hitch receiver 14.

To reconfigure the cover 12 for use with the second, larger, size hitch receiver 14, the user removes the cover 10 by pushing in on the cylindrical portions 58 to disengage the fasteners 52 and 54 from the locking pin aperture 26 and the user slides the cover out of the aperture 20 of the hitch receiver 14. Then, the user slides the adapter 34 onto the shaft 32. To slide the adapter 34 onto the shaft 32, the user inserts the alignment rail 112 of the adapter 34 with the recess 64 of the shaft 32 to properly position the adapter 34 with respect to the shaft 32. The user continues to insert the shaft 32 into the adapter 34. Meanwhile, cam surfaces 104 cause the fasteners 94 and 96 to deflect into the shaft 32 to pass the projections 84 and 86 and the cam surface 110 deflects the fastener 98 so that it slides along the top of the shaft 32. The user slides the adapter 34 onto the shaft 32 until the adapter 34 is received in the groove 40 on the back face 38 of the faceplate 30. With the adapter 34 in this position, the fasteners 52 and 54 automatically deflect out to engage the projections 80 and 82, respectively, and the third fastener 98 automatically deflects down and into engagement with the aperture 76. The fasteners 52, 54, and 98 then firmly couple the adapter 34 to the shaft 32 and the cover 10 is now configured for use with the second, larger, size hitch receiver.

Thus, the invention provides, among other things, the hitch cover 10 that can be used with hitch receivers 14 having different size apertures 20 by quickly coupling and uncoupling the adapter 34. Various features and advantages of the invention are set forth in the following claims.

What is claimed is:

1. A hitch cover for use with a first hitch receiver having a first size and a second hitch receiver having a second size larger than the first size, the hitch cover comprising:
   a faceplate;
   a shaft that extends from the faceplate, the shaft configured to be received in the first hitch receiver to couple the faceplate to the first hitch receiver;
   an adapter including a first end, a second end, and an aperture extending through the first end;
   a fastener that removably couples the adapter and the shaft, wherein the shaft is received in the aperture of the adapter and the shaft and the adapter are configured to be received in the second hitch receiver to couple the faceplate to the second hitch receiver,
   wherein the fastener is integrally formed with the shaft as a single component.

2. The hitch cover of claim 1, wherein the fastener includes an elastically deformable tab, wherein the adapter includes a projection within the aperture, and wherein the fastener engages the projection to couple the shaft and the adapter.

3. The hitch cover of claim 1, wherein the fastener is configured to couple the hitch cover without the adapter to the first hitch receiver.

4. The hitch cover of claim 3, wherein the fastener includes an elastically deformable tab including a generally cylindrical projection configured to be received in a locking pin aperture of the first hitch receiver.

5. The hitch cover of claim 4, wherein the generally cylindrical projection includes a cam surface configured to automatically deflect the elastically deformable tab when the shaft is inserted into the first hitch receiver.

6. The hitch cover of claim 4, wherein the fastener is a first fastener, the hitch cover further comprising a second fastener that is integrally formed with the shaft as a single component, wherein the second fastener includes an elastically deformable table including a generally cyclindrical projection configured to be received in the locking pin aperture of the first hitch receiver.

7. The hitch cover of claim 1, wherein the adapter includes an elastically deformable tab including a generally cylindrical projection configured to be received in a locking pin aperture of the first hitch receiver.

8. The hitch cover of claim 7, wherein the aperture of the adapter extends through the first end and the second end, and wherein the elastically deformable tab is adjacent the second end of the adapter.

9. The hitch cover of claim 1, wherein the fastener removably couples the adapter and the shaft such that the shaft and the adapter can be removed from the second hitch receiver as a single component.

10. The hitch cover of claim 1, wherein the shaft is a generally square shaft.

11. The hitch cover of claim 10, wherein the square shaft is a hollow generally square shaft.

12. The hitch cover of claim 10, wherein the generally square shaft is an approximately 1.25 inch by 1.25 inch generally square shaft.

13. The hitch cover of claim 1, wherein the adapter is not utilized to couple the faceplate to the first hitch receiver.

14. The hitch cover of claim 1, wherein the faceplate includes a groove that receives the first end of the adapter to couple the faceplate and the adapter.

15. The hitch cover of claim 1, wherein the adapter includes an alignment rail, wherein the shaft includes an elongated recesses, and wherein the alignment rail is received in the elongated recess when the adapter is coupled to the shaft.

16. A hitch cover for use with a first hitch receiver having a first size and a second hitch receiver having a second size larger than the first size, the hitch cover comprising:
a faceplate;
a square shaft that extends perpendicular from the faceplate and configured to be received in the first hitch receiver, the square shaft including a first elastically deformable tab configured to couple the faceplate to the first hitch receiver;
an adapter including a first end, a second end, an aperture extending through the first end, and a second elastically deformable tab configured to removably couple the adapter to the square shaft;
wherein the shaft is received in the aperture of the adapter and the shaft and the adapter are configured to be received in the second hitch receiver to couple the faceplate to the second hitch receiver, and wherein the square shaft does not extend into the aperture of the adapter to couple the faceplate to the first hitch receiver such that the adapter is not utilized to couple the faceplate to the first hitch receiver.

17. The hitch cover of claim 16, wherein the first elastically deformable tab of the square shaft includes a generally cylindrical projection configured to be received in a locking pin aperture of the first hitch receiver.

18. A hitch cover for use with a first hitch receiver having a first size and a second hitch receiver having a second size larger than the first size, the hitch cover comprising:
a faceplate;
a shaft that extends from the faceplate, the shaft configured to be received in the first hitch receiver to couple the faceplate to the first hitch receiver;
an adapter including a first end, a second end, and an aperture extending through the first end;
a fastener that removably couples the adapter and the shaft, wherein the shaft is received in the aperture of the adapter and the shaft and the adapter are configured to be received in the second hitch receiver to couple the faceplate to the second hitch receiver,
wherein the fastener is integrally formed with the adapter as a single component.

19. The hitch cover of claim 18, wherein the fastener includes an elastically deformable tab at least partially located within the aperture of the adapter, and wherein the shaft includes a shaft aperture, and wherein the fastener engages the shaft aperture to couple the shaft and the adapter.

20. The hitch cover of claim 18, wherein the fastener removably couples the adapter and the shaft such that the shaft and the adapter can be removed from the second hitch receiver as a single component.

* * * * *